United States Patent [19]

Baccalaro et al.

[11] Patent Number: 4,817,775
[45] Date of Patent: Apr. 4, 1989

[54] PRE-ASSEMBLED AUTOMOTIVE CLUTCH COVER ASSEMBLY

[75] Inventors: Valter Baccalaro; Carlo Beccaris, both of Santena, Italy

[73] Assignee: Valeo, Paris, France

[21] Appl. No.: 386,397

[22] Filed: Jun. 8, 1982

[30] Foreign Application Priority Data

Jun. 12, 1981 [FR] France ................................ 81 11596

[51] Int. Cl.$^4$ ............................................. F16D 13/44
[52] U.S. Cl. ................. 192/89 B; 192/70.13; 192/96
[58] Field of Search .............. 192/96, 89 B, 70.13, 192/91 A; 188/71.1, 18 A, 73.2, 218 XL, 73.32

[56] References Cited

U.S. PATENT DOCUMENTS

| | | | |
|---|---|---|---|
| 2,684,742 | 7/1954 | Eason | 192/91 A |
| 2,905,279 | 9/1959 | Moyer | 188/218 XL |
| 3,489,256 | 1/1970 | Binder et al. | 192/89 B X |
| 3,724,612 | 4/1973 | Spain | 188/218 XL |
| 4,069,905 | 1/1978 | DeGennes | 192/89 B X |
| 4,166,521 | 9/1979 | Okunishi et al. | 188/218 XL X |
| 4,210,233 | 7/1980 | Courbot | 192/89 B |
| 4,211,315 | 7/1980 | Fenart | 192/89 B X |
| 4,369,862 | 1/1983 | Seki | 188/73.32 X |

FOREIGN PATENT DOCUMENTS

| | | | |
|---|---|---|---|
| 2355821 | 5/1974 | Fed. Rep. of Germany | 188/18 A |
| 1810543 | 6/1978 | Fed. Rep. of Germany | 192/91 A |
| 1128543 | 9/1968 | United Kingdom | |
| 1351891 | 5/1974 | United Kingdom | |
| 1394118 | 5/1975 | United Kingdom | 192/89 B |
| 1416552 | 12/1975 | United Kingdom | 192/89 B |

OTHER PUBLICATIONS

Moto Technique, "Guzzi V35-50", No. 45, Apr.-Jun. 1982, pp. 137-140.

Primary Examiner—Rodney H. Bonck
Attorney, Agent, or Firm—Charles E. Brown; Charles A. Brown

[57] ABSTRACT

A clutch mechanism suitable for automotive vehicles comprises a pre-assembled pressure plate/diaphragm spring/clutch cover assembly. This assembly is fixed to the end of a driving shaft by means of the clutch cover and bolts which pass through openings formed for this purpose in the pressure plate. A friction disk is mounted elastically on a hub on a driven shaft. It is gripped between the pressure plate and a reaction plate, the latter attached to the clutch cover by means of screws which have their heads welded to the cover. A clutch operating pin acts directly on the center of the pressure plate which is dished for the purposes of oil recovery and evacuation.

8 Claims, 3 Drawing Sheets

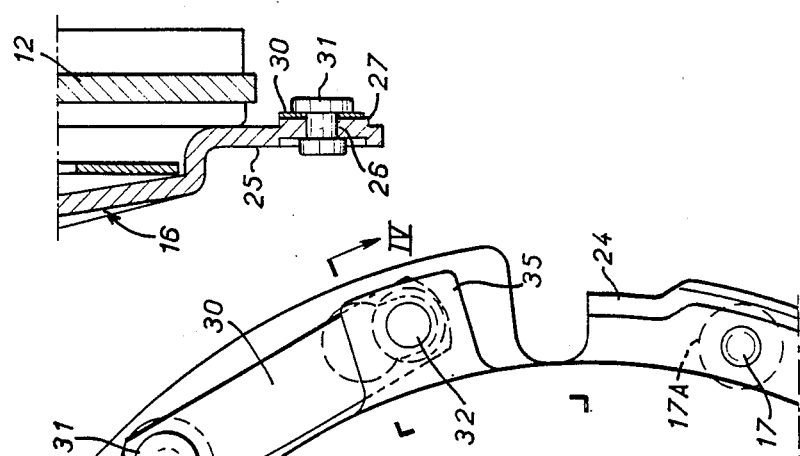
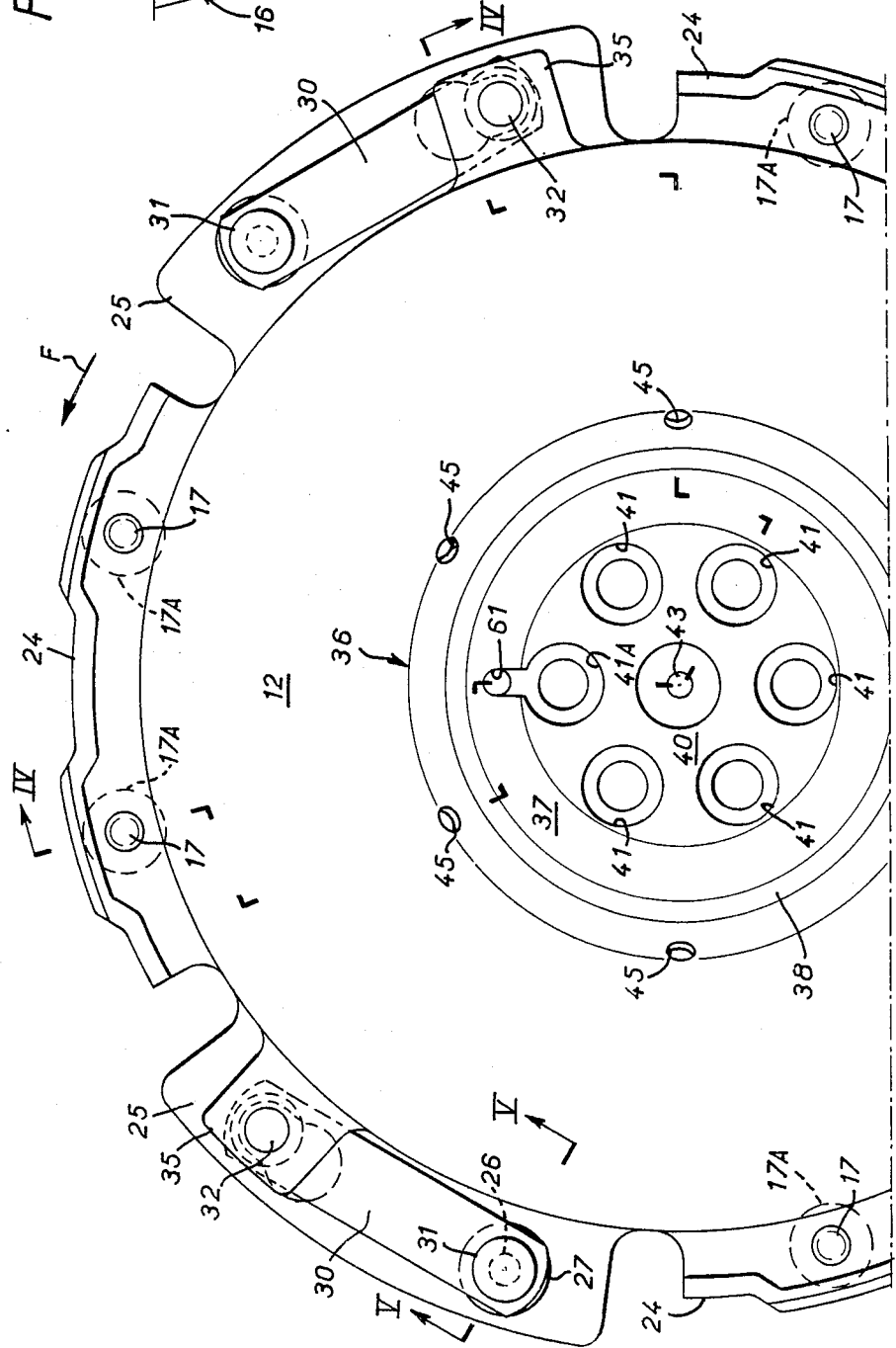

PRE-ASSEMBLED AUTOMOTIVE CLUTCH COVER ASSEMBLY

BACKGROUND OF THE INVENTION

Field of the Invention

The present invention relates to a clutch mechanism suitable for automotive vehicles of the type comprising on a driven shaft, specifically the input shaft of a gearbox, and keyed to rotate therewith a friction disk cooperating with a mechanism carried by a driving shaft, specifically the crankshaft of a propulsion motor, with a pressure plate/diaphragm spring/clutch cover assembly on one side and a reaction plate on the other side.

The invention is more particularly concerned with mechanisms of this kind comprising a pressure plate/diaphragm spring/clutch cover assembly which is pre-assembled in order to facilitate assembly.

The invention proposes an improved construction of such mechanisms with the objective of procuring ease of assembly in conjunction with simplification of the mechanism and a compact and reliable structure.

In accordance with a principal aspect of the invention there is proposed a pre-assembled pressure plate/diaphragm spring/clutch cover assembly adapted to be fixed via the clutch cover to the end of a driving shaft by means of a plurality of screws distributed around the axis of the shaft, holes being formed in the pressure plate through which the screws pass.

This arrangement makes it an economic, simple and fast operation to attach the completely pre-assembled assembly to the end of a crankshaft, for example, in minimum time and without special-purpose tools.

For the subsequent mounting of the reaction plate, which may with advantage constitute the flywheel with the starter toothed ring around its periphery, a series of fixing bolts are fixed to the edge of the clutch cover, by welding under the head, for example.

The pressure plate may be advantageously formed so as to receive directly at its center the thrust exerted by the clutch operating pin and to collect leaking oil so as to protect the friction disk.

For the sub-assembly comprising the clutch cover and the pressure plate associated with its coupling links there is advantageously provided a bayonet-type coupling by means of fixing rivets incorporating pegs provided with a bearing shoulder to limit distension of the diaphragm and thus of the pressure plate in the storage position.

Other objects and advantages will appear from the following description of an example of the invention, when considered in connection with the accompanying drawings, and the novel features will be particularly pointed out in the appended claims.

BRIEF DESCRIPTION OF THE DRAWINGS

FIG. 2 is a view in elevation along the arrow II in FIG. 1.

FIG. 5 is a detail cross-section on the line V—V in FIG. 2.

DESCRIPTION OF THE PREFERRED EMBODIMENT

Figure 1:
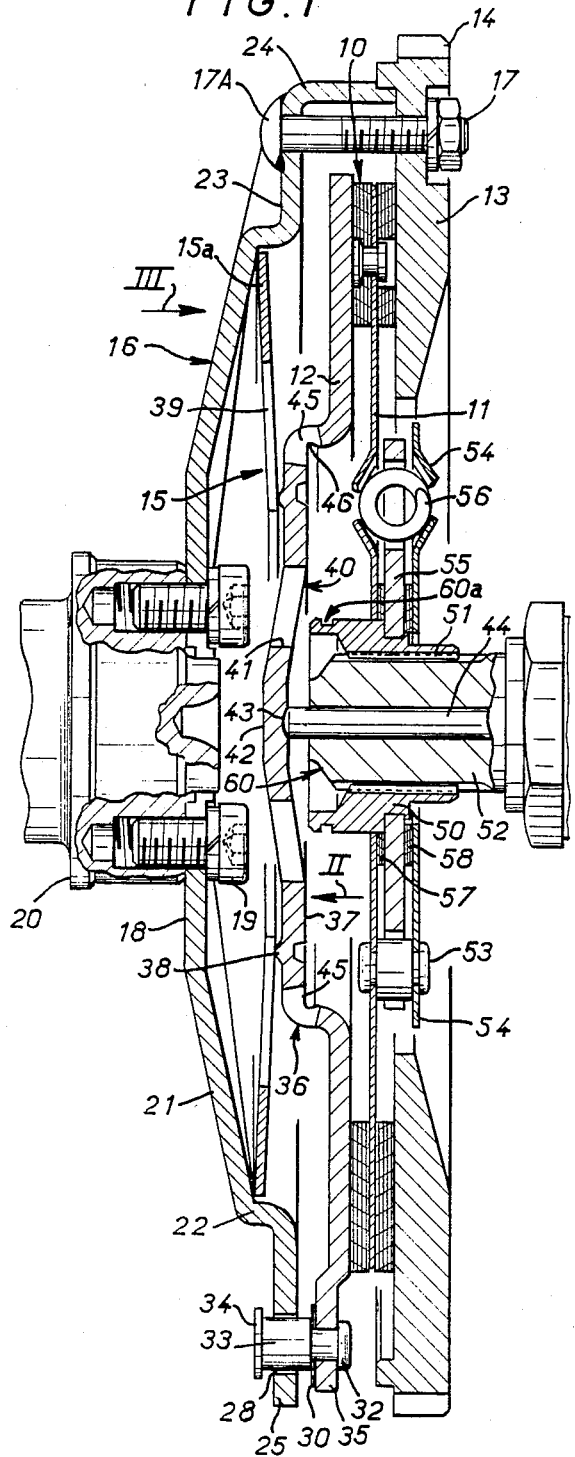
FIG. 1 is an axial cross-section through an assembled clutch mechanism.

In the embodiment shown, a friction disk 10 carried by a clutch disk 11 is trapped between a pressure plate 12 and a reaction plate 13 around the periphery of which is the starter toothed ring 14. Pressure plate 12 is continously urged in the direction of reaction plate 13 by a diaphragm spring 15, the peripheral part 15a of which constitutes a Belleville washer and bears on a clutch cover 16 fixed to reaction plate 13 by a number of bolts 17. The generally plane central portion 18 of the clutch cover is adapted to be fixed by means of a series of screws 19 to the hub 20 of a driving shaft, in this instance the crankshaft of a drive motor. Around central portion 18 the clutch cover has a generally frusto-conical flared area 21 terminating in a tilting support area 22 for the diaphragm spring forming a shallow centering recess surrounded by a radially oriented rim 23 flanked along its periphery by areas 24 for fixing it to reaction plate 13 alternating with areas 25 for coupling it to pressure plate 12. In line with each fixing area 24 rim 23 carries two bolts 17, the head 17a of each bolt being attached to the external surface of the clutch cover by welding, in accordance with an advantageous feature of the invention. Each of coupling areas 25 comprises a hole 26 through which a rivet passes (see also FIG. 5) at the center of a circular pad 27 which is slightly offset in the axial direction, by stamping, towards pressure plate 12. Coupling area 25 comprises, at a certain distance from the aforementioned hole 26, a keyhole-shaped opening 28 constituting one component part of a bayonet-type coupling to which further reference will be had later.

In the embodiment shown there are three coupling areas 25 alternating with three fixing areas 24. Each coupling area 25 is adapted to cooperate with a coupling lug 35 (FIG. 2) provided for this purpose on the periphery of pressure plate 12. A coupling link 30 is connected in a manner known per se between each lug 35 of the pressure plate and each area 25 of the clutch cover. One end of each link 30 is fixed by means of a rivet 31 to the pad 27 formed for this purpose on coupling area 25 (see FIG. 5 in particular). The other end of link 30 is connected by means of a rivet 32 to the adjacent lug 35 of the pressure plate, this rivet being extended by means of a cylindrical peg 33 with a widened head and shoulder 34. This shoulder is adapted to pass through the insertion portion, here circular, of keyhole-shaped opening 28, whereas the cylindrical body of peg 33 is adapted to engage in the narrower lateral extension of said opening 28.

It should be noted that a specific feature of the invention consists in the fact that pad 27 carrying the rivet attaching coupling link 30 to the clutch cover is offset in the direction of the pressure plate whereas on the pressure plate the fixing lug 35 for the same link 30 is slightly offset axially towards the clutch cover and more specifically coupling area 25 thereof.

The effect of this arrangement is to position coupling links 30 in a plane which is practically perpendicular to the axis of the mechanism so that in normal operation, involving rotation in the direction of arrow F in FIG. 2, they drive pressure plate 12 from the clutch cover with an orientation which is practically tangential. This arrangement reduces the stress on the links by reducing their maximum degree of bending while also reducing the axial dimension.

Pressure plate 12 is preferably fabricated by stamping on a press and comprises a central region which is generally concentric in the operative position with recessed area 22 of cover 16, which has a generally axial peripheral region 36 offset axially towards the clutch cover by stamping and terminating in an annular region 37 which is generally perpendicular to the axis and in which is formed by stamping a bead 38 providing a line of contact and tilting support for the fingers 39 of diaphragm spring 15. Inwardly of annular region 37 in the radial direction is an oblique area 40 formed with a series of openings 41 and leading to a central area 42 forming the base of the dished shape. At the center of this central area is formed a recess 43 designed to withstand the thrust exerted by the clutch operating pin 44. In the peripheral area of this dished region 36 of the pressure plate there are formed a series of openings 45. On the inner periphery of this peripheral region there is formed by stamping an oil recovery groove or trough 46.

In the operative position an opening 41 is located opposite each of screws 19 for fixing the clutch cover to hub 20 of the crankshaft. The diameter of these openings 41 corresponds to the diameter of the head of screws 19 so as to permit a screw to pass through each opening. The heads of screws 19 are advantageously of the hexagonal socket type, in order to minimize the diameter of openings 41.

Figure 4:
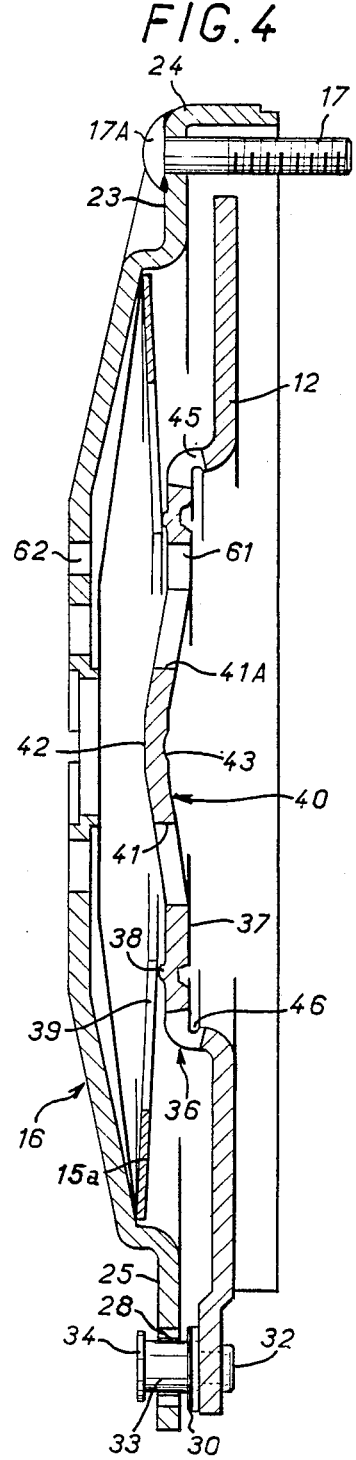
FIG. 4 is a cross-section on the line IV—IV in FIG. 2.
Figure 3:
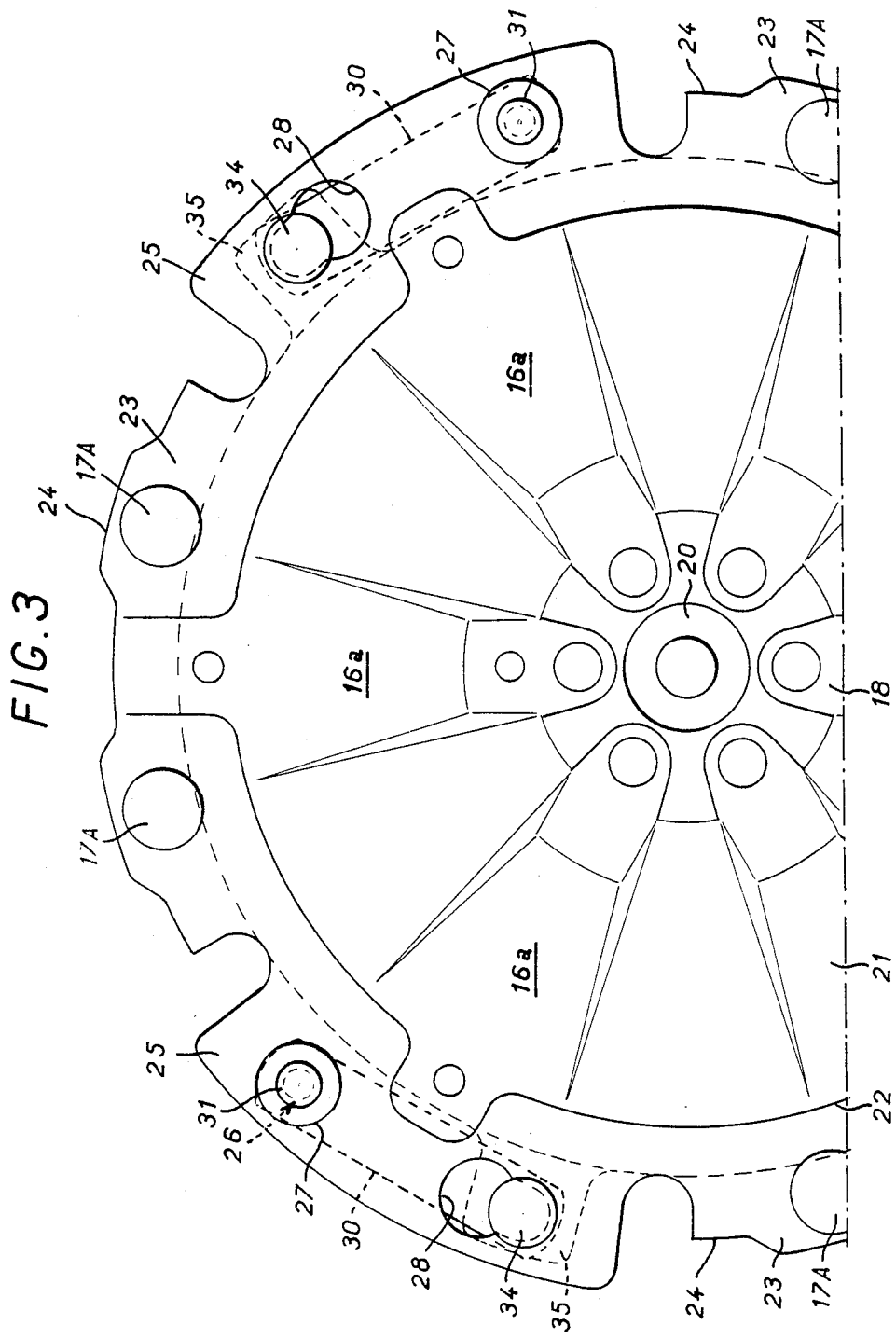
FIG. 3 is a view in elevation along the arrow III in FIG. 1.

It should be noted that openings 45 and groove 46 are machined into the pressure plate before it is stamped, this explaining the deformation visible in FIGS. 1 and 4 of the cross-sectional shape of these openings. It will be seen that these openings have a cross-section which widens from the side facing clutch disk 11 towards the side facing clutch cover 16.

Clutch disk 11 is mounted in the usual manner, being free to rotate within a predetermined range of relative angular movement on a hub 50 mounted on splines 51 on the end of the driven shaft 52, in this instance the input shaft of a gearbox.

Disk 11 is rendered fast with a guide ring 54 by means of pegs 53, disk 11 and ring 54 being disposed on opposite sides of a flange 55 on hub 50. Between the assembly formed by disk 11 and ring 54 on the one hand and the flange 55 of hub 50 on the other hand there is an elastic coupling formed by a series of torsion springs 56 disposed circumferentially between them. Furthermore, friction rings 57, 58 disposed between the flange 55 of hub 50 and disk 11 on the one hand and guide ring 54 on the other hand provide damping of the elastic coupling thus formed in the usual manner.

An annular groove 60 is formed on the front surface of hub 50 around the end of shaft 52, along the axis of which is formed the passage in which clutch operating pin 44 slides. A peripheral annular groove 60a is formed on the outside diameter of hub 50 in that part which extends towards the inside of dished area 36, in the vicinity of said front surface. Note from FIG. 1 that this groove 60a is substantially opposite oil recovery groove 46.

Finally, note the presence as usual of centering holes or openings intended to facilitate assembly of the mechanism: thus (FIG. 2) in annular region 37 of pressure plate 12 there is a notch 61 extending away from opening 41A and designed to permit the passage of a centering pin (not shown) extending towards a centering hole 62 in the clutch cover (see also FIG. 4).

The simplicity of the mechanism formed in this way will be readily appreciated, as will the ease of manufacture, assembly and maintenance.

Assembly of the clutch cover/diaphragm spring/pressure plate assembly as shown in FIG. 2 is facilitated in particular by the bayonet-type coupling system adopted. Links 30 are first fixed to lugs 35 of plate 12 by means of rivets 32 with peg 33. With diaphragm spring 15 engaged within area 22, it is only necessary to engage these pegs in keyhole-shaped openings 28, to push them fully home in the extensions thereof and to terminate the assembly operation by fitting fixing rivets 31 to adjacent pads 27 of the clutch cover, in which diaphragm spring 15 has previously been placed. From this point onwards, shoulders 34 on the pegs abut against the narrow part of keyhole-shaped openings 28 to prevent complete distension of the diaphragm spring in the storage position, preventing any deterioration of links 30.

Once assembled in this manner, the assembly is fixed to the crankshaft by means of screws 19 which pass through holes 41 formed for this purpose in the pressure plate.

The friction disk assembly may be pre-fitted to hub 50, the end of shaft 52 being engaged subsequently by means of the splined coupling 51.

After centering the friction disk on pressure plate 12 by means of an appropriate tool, it is then sufficient to bring flywheel 13-14 into position with its fixing holes facing bolts 17. The fact that the heads 17a of the latter are already welded to the clutch cover further simplifies the fitting of the flywheel, plate 12 being retained in the proximity of the cover by shoulders 34, the length of bolts 17 being sufficient for the fitting of washers and nuts following engagement of plate 13 to be a simple matter, specifically requiring no pressure whatsoever to be exerted on the plate. Following removal of the centering tools, it is only necessary to tighten down all bolts 17 to terminate assembly with the fitting of the gearbox by engaging shaft end 52 in splined coupling 51 of hub 50.

In operation, clutch operating pin 44 presses directly on pressure plate 12. Leaking oil, notably from the clutch operating pin bore, is recovered through groove 60 formed for this purpose in the front of hub 50 of the friction disk. It is then centrifuged into dished region 36 of the pressure plate to be collected in peripheral groove 46, then escaping through radial holes 45 to the outside of the plate, where there is no further risk of it reaching friction disk 10. Peripheral annular groove 60a also contributes to preventing leaking oil reaching the friction pads of friction disk 10. It collects oil which might tend to spread by capillary action and accumulates it until it is ejected by centrifugal force towards groove 46, whence the advantage of having grooves 46 and 60a substantially aligned with one another.

The extreme simplicity and compact structure of the mechanism thus constituted should be emphasized. This compactness results in particular from penetration of hub 50 carrying the friction disk into dished region 36 of pressure plate 12, and the penetration of this dished region itself into the recessed region 22 of the clutch cover. The attachment of the mechanism to the end of the driving shaft (specifically the motor crankshaft) via the clutch cover offers the advantage of providing space around and easy access to the flywheel comprising reaction plate 13 and starter toothed ring 14.

The advantageous nature of the structure of clutch cover 16 should be noted. It is formed by stamping with a plurality of generally radial ribs 16a which stiffen the cover without additional component parts. It is in an area beyond these ribs in the radial direction and therefore not affected by them that the tilting support area 22 is found.

A clutch mechanism of this design is therefore advantageously adapted to equipping lightweight vehicles, especially small motorcycles.

It will be understood that various changes in the details, materials and arrangements of parts, which have been herein described and illustrated in order to explain the nature of the invention, may be made by those skilled in the art within the principle and scope of the invention as expressed in the appended claims.

It is claimed:

1. A clutch suitable for automotive vehicles, said clutch comprising a pre-assembled cover assembly incorporating a pressure plate, a diaphragm spring and a clutch cover, said pressure plate being mounted for limited axial displacement relative to said clutch cover against the bias of said diaphragm spring, a plurality of fixing screws for attaching said clutch cover to a driving shaft, a reaction plate adapted to be fixed for rotation with the driving shaft and a friction disc adapted to be mounted on a driven shaft and disposed axially between said reaction plate and said pressure plate, said pressure plate having a dished central region offset axially towards said clutch cover, a fulcrum defined on the side of said pressure plate remote from said reaction plate for engagement with said diaphragm spring, a peripheral part of said diaphragm spring bearing against said clutch cover and urging said pressure plate to grip said friction disc between said pressure plate and said reaction plate, a plurality of openings in said dished central region for receiving said fixing screws thereby enabling said pre-assembled cover assembly to be mounted as a unit, said dished central region having an outer margin including an annular plurality of holes which open into an annular oil recovery groove on that side of said pressure plate facing said friction disc.

2. A clutch according to claim 1, together with a hub supporting said friction disc, part of said hub extending towards said dished central region, said hub having a peripheral oil recovery groove extending along its outer periphery.

3. A clutch according to claim 2, wherein said peripheral oil recovery groove is substantially facing said annular oil recovery groove.

4. A clutch according to claim 1, together with a hub supporting said friction disc, said hub in an operative position of said clutch protruding into said dished central region of said pressure plate and having an end surface facing said pressure plate, said end surface having an oil recovery groove along its periphery.

5. A clutch according to claim 1 wherein said fulcrum is defined in said dished central region proximate the inner periphery of said diaphragm spring.

6. A clutch suitable for automotive vehicles, said clutch comprising a pre-assembled cover assembly incorporating a pressure plate, a diaphragm spring and a clutch cover, said pressure plate being mounted for limited axial displacement relative to said clutch cover against the bias of said diaphragm spring, a plurality of fixing screws for attaching said clutch cover to a driving shaft, a reaction plate adapted to be fixed for rotation with the driving shaft and a friction disc adapted to be mounted on a driven shaft and disposed axially between said reaction plate and said pressure plate, said pressure plate having a dished central region offset axially towards said clutch cover, a fulcrum defined on the side of said pressure plate remote from said reaction plate for engagement with said diaphragm spring, a peripheral part of said diaphragm spring bearing against said clutch cover and urging said pressure plate to grip said friction disc between said pressure plate and said reaction plate, a plurality of openings in said dished central region for receiving said fixing screws thereby enabling said pre-assembled cover assembly to be mounted as a unit, a hub supporting said friction disc, said hub in an operative position of said clutch protruding into said dished central region of said pressure plate and having an end surface facing said pressure plate, said end surface having an oil recovery groove along its periphery.

7. A clutch according to claim 6 wherein said fulcrum is defined in said dished central region proximate the inner periphery of said diaphragm spring.

8. A clutch suitable for automotive vehicles, said clutch comprising a pre-assembled cover assembly incorporating a pressure plate, a diaphragm spring and a clutch cover, said diaphragm spring being of the type including an outer Belleville washer part and inner radially extending circumferentially spaced fingers, said pressure plate being mounted for limited axial displacement relative to said clutch cover against the bias of said diaphragm spring, a plurality of fixing screws for attaching said clutch cover to a driving shaft, a reaction plate adapted to be fixed for rotation with the driving shaft and a friction disc adapted to be mounted on a driven shaft and disposed axially between said reaction plate and said pressure plate, said pressure plate having a dished central region offset axially towards said clutch cover, a fulcrum defined in said dished central region on the side of said pressure plate remote from said reaction plate for engagement with said diaphragm spring proximate the inner periphery thereof, a peripheral part of said diaphragm spring bearing against said clutch cover and urging said pressure plate to grip said friction disc between said pressure plate and said reaction plate, a plurality of openings in said dished central region for receiving said fixing screws thereby enabling said pre-assembled cover assembly to be mounted as a unit; between said clutch cover and said pressure plate, a plurality of straps attaching a plurality of coupling areas around the perimeter of said clutch cover to a corresponding plurality of radial lugs formed on the rim of said pressure plate, each strap extending in a substantially tangential direction relative to said pressure plate, and said straps being attached to respective lugs of said pressure plate by rivets, said rivets having shanks cooperating with closed contour key hole-shaped openings formed in said coupling areas of said clutch cover for bayonet-type assembly and disposed radially outwardly with respect to the diaphragm spring.

* * * * *